(12) United States Patent
Yee et al.

(10) Patent No.: US 10,389,935 B2
(45) Date of Patent: Aug. 20, 2019

(54) METHOD, SYSTEM AND APPARATUS FOR CONFIGURING A VIRTUAL CAMERA

(71) Applicant: CANON KABUSHIKI KAISHA, Tokyo (JP)

(72) Inventors: Belinda Margaret Yee, Balmain (AU); Andrew James Dorrell, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 15/377,608

(22) Filed: Dec. 13, 2016

(65) Prior Publication Data

US 2018/0167553 A1  Jun. 14, 2018

(51) Int. Cl.
*H04N 5/232* (2006.01)
*G06T 7/292* (2017.01)
*G06T 15/20* (2011.01)

(52) U.S. Cl.
CPC ......... *H04N 5/23222* (2013.01); *G06T 7/292* (2017.01); *G06T 15/205* (2013.01); *H04N 5/23216* (2013.01); *G06T 2207/30241* (2013.01)

(58) Field of Classification Search
CPC ............ H04N 5/23222; H04N 5/23216; G06T 7/292; G06T 2207/30241
USPC ........................................................ 348/143
See application file for complete search history.

(56) References Cited

U.S. PATENT DOCUMENTS

| | | | |
|---|---|---|---|
| 6,124,862 A | 9/2000 | Boyken et al. | |
| 8,284,258 B1 * | 10/2012 | Cetin | H04N 7/183 348/169 |
| 2003/0179294 A1 | 9/2003 | Martins | |
| 2008/0192116 A1 | 8/2008 | Tamir | |
| 2009/0066784 A1 | 3/2009 | Stone | |
| 2010/0026809 A1 | 2/2010 | Curry | |
| 2010/0194891 A1 | 8/2010 | Hikita | |
| 2010/0208942 A1 | 8/2010 | Porter | |
| 2011/0164116 A1 * | 7/2011 | Gay | G06T 19/006 348/47 |
| 2012/0086659 A1 * | 4/2012 | Perlin | G06F 3/005 345/173 |
| 2013/0120581 A1 | 5/2013 | Daniels | |
| 2014/0300687 A1 * | 10/2014 | Gillard | G06T 15/20 348/36 |
| 2015/0147047 A1 * | 5/2015 | Wang | H04N 5/2621 386/280 |

(Continued)

OTHER PUBLICATIONS

Gans, N. R., G. HU, and W. E. Dixon. "Keeping Multiple Objects in the Field of View of a Single PTZ Camera." 2009 American Control Conference, pp. 5259-5264, Jun. 10, 2009-Jun. 12, 2009.

*Primary Examiner* — Zaihan Jiang
(74) *Attorney, Agent, or Firm* — Canon U.S.A., Inc. IP Division

(57) ABSTRACT

A computer-implemented method of configuring a virtual camera. A first and second object in a scene are detected, each object having at least one motion attribute. An interaction point in the scene is determined based on the motion attributes of the first and second objects. A shape envelope of the first and second objects is determined, the shape envelope including an area corresponding to the first and second objects at the determined interaction point. The virtual camera is configured based on the determined shape envelope to capture, in a field of view of the virtual camera, the first and second objects.

20 Claims, 9 Drawing Sheets

(56) References Cited

U.S. PATENT DOCUMENTS

| | | | | |
|---|---|---|---|---|
| 2015/0172634 A1* | 6/2015 | Wheeler | ........ | H04N 21/21805 |
| | | | | 348/47 |
| 2015/0193979 A1* | 7/2015 | Grek | ............ | G06F 1/1694 |
| | | | | 345/633 |
| 2016/0227127 A1* | 8/2016 | Hyttinen | ............ | H04N 5/247 |
| 2017/0017302 A1* | 1/2017 | Libal | ............ | G06F 3/017 |
| 2017/0132830 A1* | 5/2017 | Ha | ............ | G06T 15/005 |
| 2017/0195664 A1* | 7/2017 | Li | ............ | G06T 7/004 |
| 2017/0282075 A1* | 10/2017 | Michot | ............ | H04L 67/02 |

* cited by examiner

METHOD, SYSTEM AND APPARATUS FOR CONFIGURING A VIRTUAL CAMERA

TECHNICAL FIELD

The current invention relates to the field of viewpoint synthesis and in particular to the selection of a position for a virtual camera. The present invention also relates to a method, system and apparatus for configuring a virtual camera, and to a computer program product including a computer readable medium having recorded thereon a computer program for configuring a virtual camera.

BACKGROUND

Image based rendering allows the synthesis of an image for a virtual point of view from a collection of camera images. The point of view of a camera may also be referred to as a 'viewpoint'. For example, where a subject is surrounded by a ring of cameras, it is known that a new (virtual camera) view of the subject, corresponding to a position in between (real camera) captured views, can be synthesised from captured views if there is sufficient knowledge of camera configuration and a scene.

In recent times, the ability to synthesise an arbitrary viewpoint has been promoted for the purpose of "free viewpoint" video where a viewer is able to actively adjust camera viewpoint to his or her preference within constraints of a capture system. Alternatively, a video producer may employ the free viewpoint technology to construct an "optimal" viewpoint for a passive broadcast audience. In the latter case, considerable flexibility is afforded to the producer such that timely creation of optimal viewpoints, especially for live events such as sports, may be difficult simply because of the range of possibilities available.

In several examples of a viewpoint determining system, subjects within an arena are identified and tracked, possibly using wearable tracking devices that provide real-time information about the location of a subject. The provided information is used, in combination with other attributes of the subject (e.g., including complex knowledge like the relative location of limbs, the centroid of the body etc.) to create a virtual camera that is tethered to and frames the subject. While such a viewpoint determining system is able to create a tracking camera, the viewpoint determining system fails to produce broadcast quality footage in cases where there are interactions between subjects or other events that comprise more than a single subject.

A need exists for methods and systems capable of generating appropriate synthetic viewpoints automatically.

SUMMARY

It is an object of the present invention to substantially overcome, or at least ameliorate, one or more disadvantages of existing arrangements.

Disclosed are arrangements which seek to address the above problems by determining the position of a virtual camera based on prediction of an interaction in combination with compositional constraints that lead to a broadcast worthy framing of subjects involved in the interaction. The use of prediction allows a position of the camera to be determined early so that a smooth coverage of the interaction can be achieved. If the interaction fails to eventuate then it is inconsequential as the rendering from the virtual camera can terminated or discarded. The use of novel composition rules allows the generation of framed content that is engaging and comfortable to watch by a typical passive viewer.

The disclosed arrangements are well suited to use in generating video coverage of short duration events involving a set of interacting actors. The events may include tackles and similar interactions as are typical in sporting events. Such interactions occur in a wide class of events including team and multi-player sports.

According to one aspect of the present disclosure, there is provided a computer-implemented method of configuring a virtual camera, said method comprising:

detecting a first and second object in a scene, each said object having at least one motion attribute;

determining an interaction point in the scene based on the motion attributes of the first and second objects;

determining a shape envelope of the first and second objects, the shape envelope including an area corresponding to the first and second objects at the determined interaction point; and configuring the virtual camera based on the determined shape envelope to capture, in a field of view of the virtual camera, the first and second objects.

According to another aspect of the present disclosure, there is provided an apparatus for configuring a virtual camera, said apparatus comprising:

means for detecting a first and second object in a scene, each said object having a at least one motion attribute;

means for determining an interaction point in the scene based on the motion attributes of the first and second objects;

means for determining a shape envelope of the first and second objects, the shape envelope including an area corresponding to the first and second objects at the determined interaction point; and means for configuring the virtual camera based on the determined shape envelope to capture, in a field of view of the virtual camera, the first and second objects.

According to still another aspect of the present disclosure, there is provided a system for configuring a virtual camera, said system comprising:

a memory for storing data and a computer program;

a processor coupled to the memory for executing the computer program, the computer program comprising instructions for:

detecting a first and second object in a scene, each said object having at least one motion attribute;

determining an interaction point in the scene based on the motion attributes of the first and second objects;

determining a shape envelope of the first and second objects, the shape envelope including an areas corresponding to the first and second objects at the determined interaction point; and configuring the virtual camera based on the determined shape envelope to capture, in a field of view of the virtual camera, the first and second objects at the determined interaction point.

According to still another aspect of the present disclosure, there is provided a non-transitory computer readable medium having a program stored on the medium for configuring a virtual camera, said program comprising:

code for detecting a first and second object in a scene, each said object having at least one motion attribute;

code for determining an interaction point in the scene based on the motion attributes of the first and second objects;

code for determining a shape envelope of the first and second objects, the shape envelope including an area corresponding to the first and second objects at the determined interaction point; and code for configuring the virtual camera based on the determined shape envelope to capture, in a field of view of the virtual camera, the first and second objects.

According to still another aspect of the present disclosure, there is provided a computer-implemented method of configuring a virtual camera, said method comprising:

detecting a first object and second object in a scene, each said object having a position and at least one motion attribute;

determining an interaction point in the scene based on the positions and the motion attributes of the first and second objects; and configuring the virtual camera based on a position of the first object and the second object at the determined interaction point relative to a configured point of view of the virtual camera.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
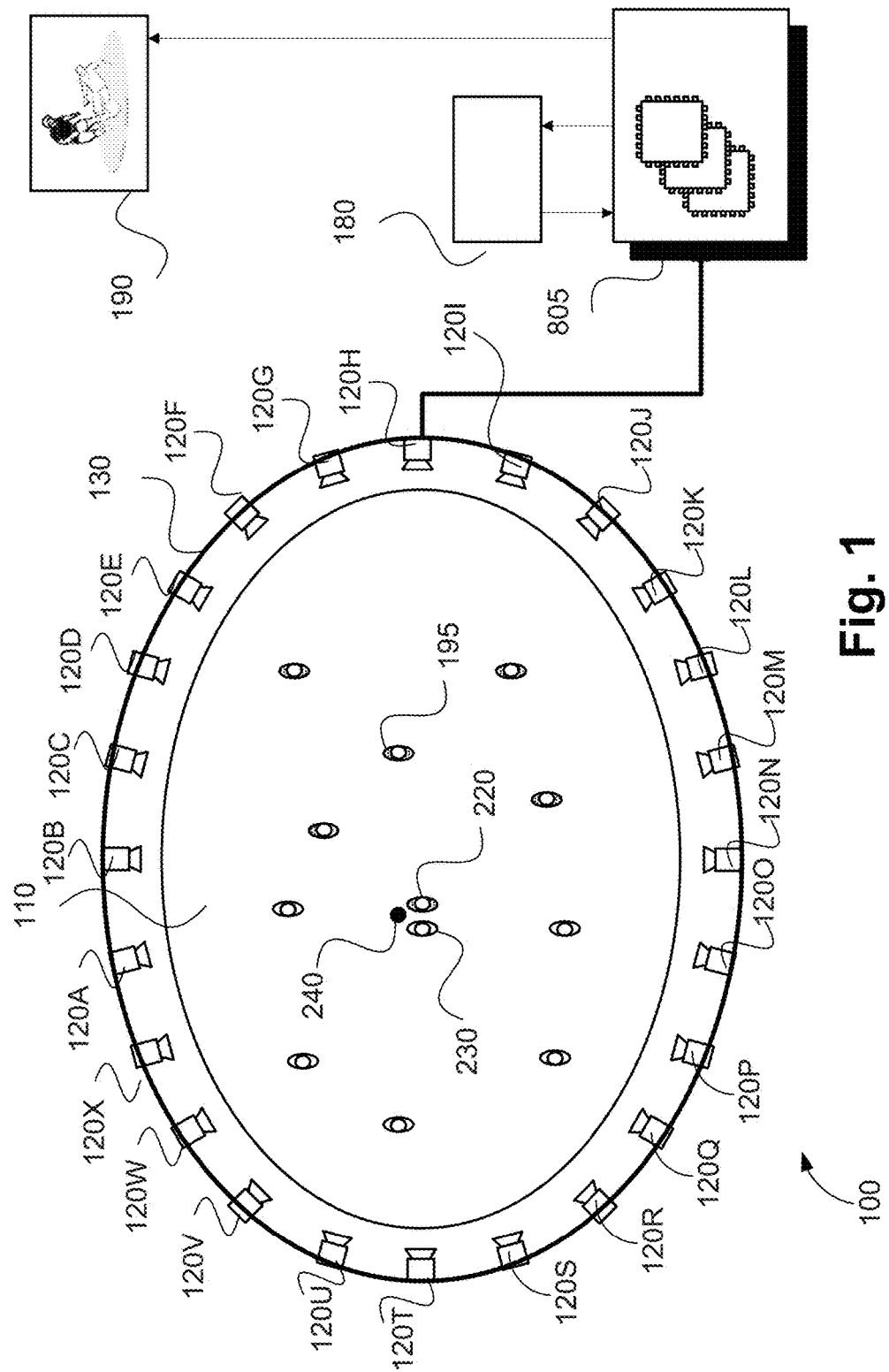
FIG. 1 is a schematic block diagram of a data processing architecture.

Where reference is made in any one or more of the accompanying drawings to steps and/or features, which have the same reference numerals, those steps and/or features have for the purposes of this description the same function(s) or operation(s), unless the contrary intention appears.

Arrangements described herein are adapted for use in the context of a sports or similar performance arena as shown for example in FIG. 1. As seen in FIG. 1, arena 110 is centred on a playing field that is approximately rectangular, oval or circular, allowing the arena 110 to be surrounded by one or more rings of cameras 120A-120X. As seen in FIG. 1, the arena 110 includes a single ring of cameras 120A-120X. Each of the cameras 120A-120X is physically located at a respective predetermined location with respect to the arena 110. The arena 110, in the example of FIG. 1, contains players from a first team (e.g. 220) and a second team (e.g. 230) and a ball 240. In the example of FIG. 1, the player 220 may be represented by a first object, the player 230 may be represented by a second object and the ball 240 by a third object.

The cameras 120A-120X of the ring of cameras shown in FIG. 1 are synchronised to capture frames at the same instants in time so that all points on the playing field defined by the arena 110 are captured simultaneously from a large number of points of view (or viewpoints).

In some variations, the full ring of cameras as shown in FIG. 1 is not used, but rather some subset(s) of the ring of cameras may be used. Arrangements where some subset of the ring cameras of FIG. 1 is used may be advantageous when certain points of view (or viewpoints) are predetermined to be unnecessary ahead of time.

Figure 8A:
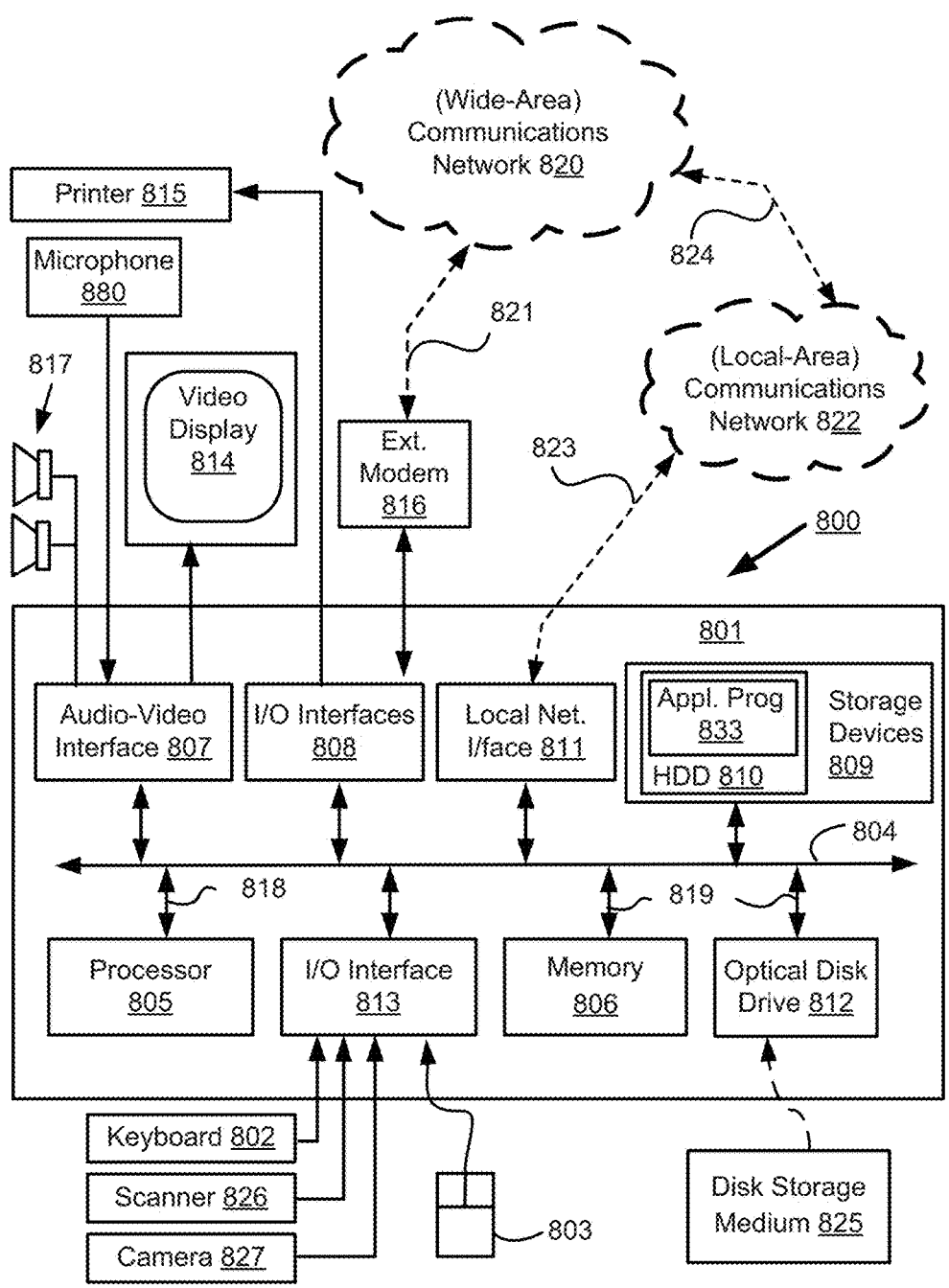
FIGS. 8A and 8B form a schematic block diagram of a general purpose computer system upon which arrangements described can be practiced.

Video frames captured by a camera, such as the camera 120A, are subject to processing and temporary storage near the camera 120A prior to being made available, via a network connection 130, to a processing unit 805 (see FIGS. 8A and 8B) configured for performing video processing. As seen in FIG. 8A, the processing unit 805 is configured within a computer module 801. However, in an alternative arrangement, a separate video processing unit may be used to implement the described arrangements.

The processing unit 805 receives controlling input from a controller 180 that specifies the position of a virtual camera within the arena 110. The processing unit 805 may be configured to synthesise an image for a specified camera point of view (or viewpoint) 190 based on video streams available to the processing unit 805 from the cameras 120A-120X surrounding the arena 110. The virtual camera position input may be generated by a human virtual camera operator and be based on input from a user interface device such as a joystick, mouse 803 (see FIG. 8A) or similar controller including dedicated controllers comprising multiple input components. Alternatively, the camera position may be generated fully automatically based on analysis of game play. Hybrid control configurations are also possible whereby some aspects of the camera positioning are directed by a human operator and others by an automated algorithm. For example, coarse positioning may be performed by a human operator and fine positioning, including stabilisation and path smoothing, may be performed by an automated algorithm.

The processing unit 805 may be configured to achieve frame synthesis using any suitable image based rendering method. Image based rendering methods may be based on sampling pixel data from a set of cameras of known geometric arrangement and combining the sampled pixel data into a synthesised frame. In addition to sample based rendering a requested frame, the processing unit 805 may be additionally configured to perform synthesis, 3D modelling, in-painting or interpolation of regions as required to cover sampling deficiencies and to create frames of high quality visual appearance. The processing unit 805 may also be configured to provide feedback in the form of the frame quality or the completeness of camera coverage for the requested viewpoint so that the device generating the camera position control signal can be aware of the practical bounds of the processing unit 805. Video streams 190 created by the processing unit 805 may subsequently be provided to a production desk (not depicted) where the video streams 190 can be edited together to form a broadcast video. Alternatively, the video streams 190 may be broadcast unedited or stored for later compilation.

Figure 8B:
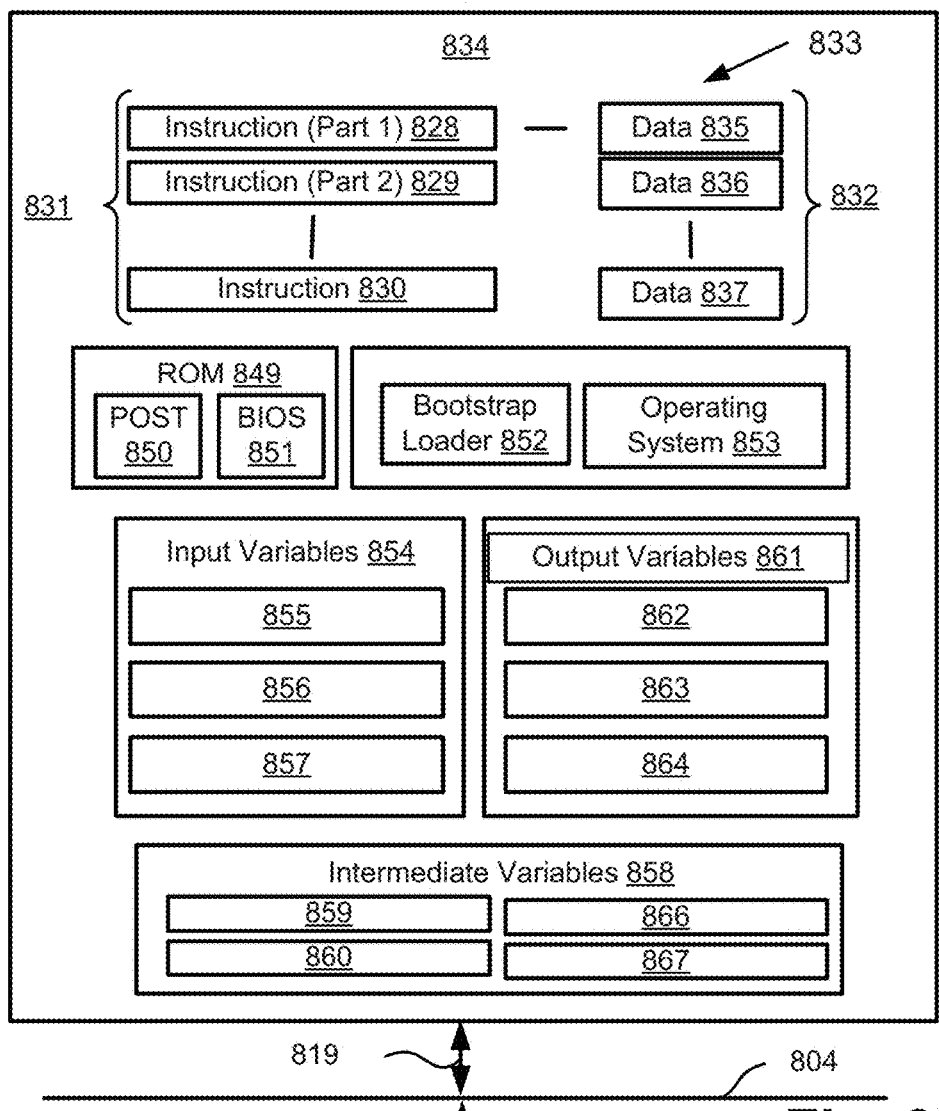
Figure 8B:
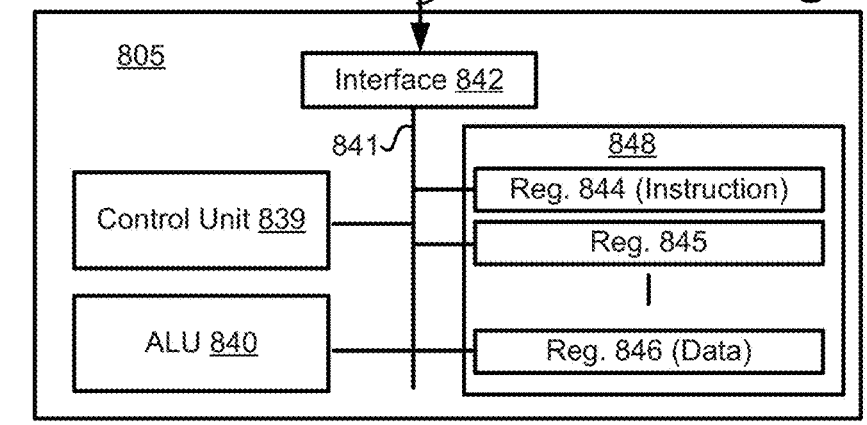

FIGS. 8A and 8B depict a general-purpose computer system 800, upon which the various arrangements described can be practiced.

As seen in FIG. 8A, the computer system 800 includes: the computer module 801; input devices such as a keyboard 802, a mouse pointer device 803, a scanner 826, a camera 120A-120X, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least the processing unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 800.

The components 805 to 813 and 170 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles, Sun Sparcstations, Apple Mac™ or like computer systems.

Figure 3:
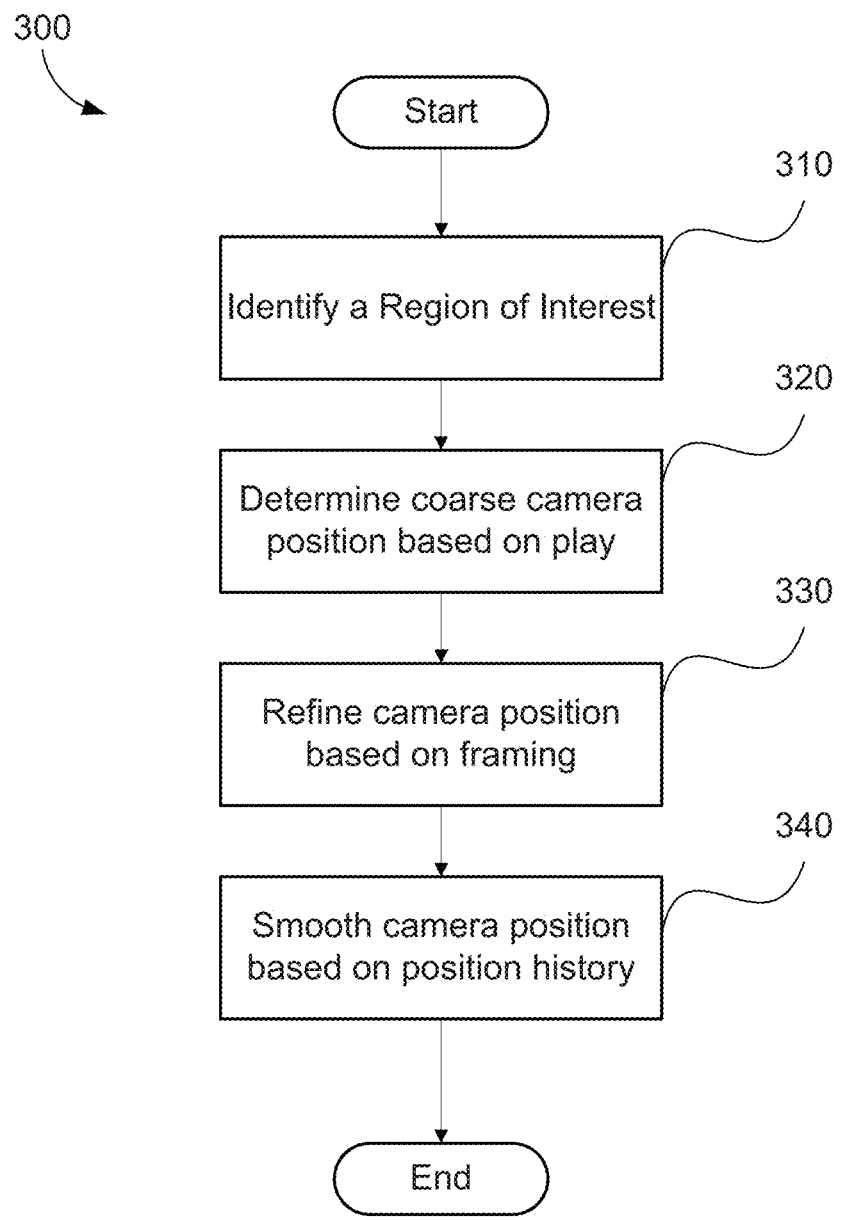
FIG. 3 is a schematic flow diagram showing a method of determining position of a virtual camera.
Figure 4:
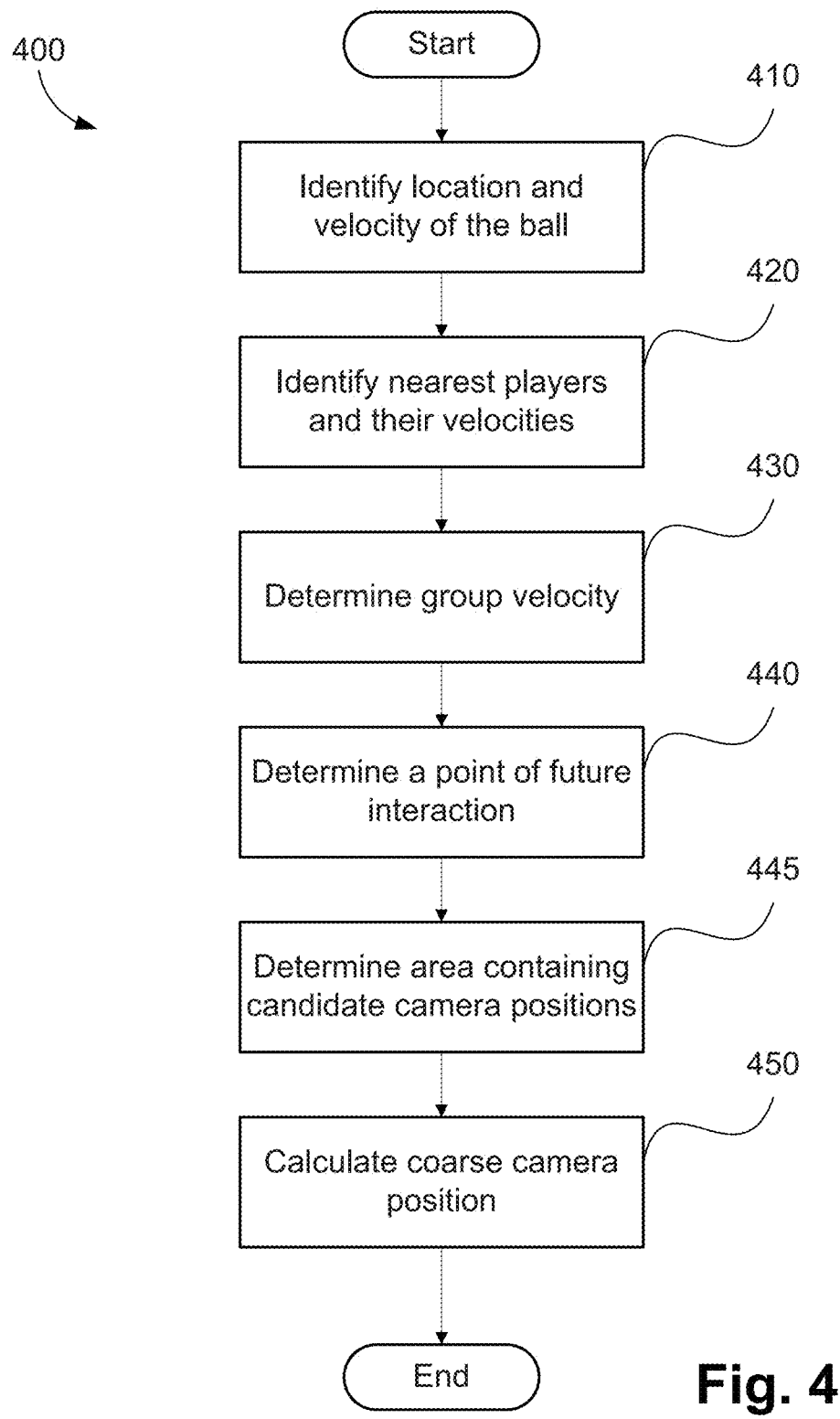
FIG. 4 is a schematic flow diagram showing a method of determining a coarse camera position, as used in the method of FIG. 3.
Figure 5:
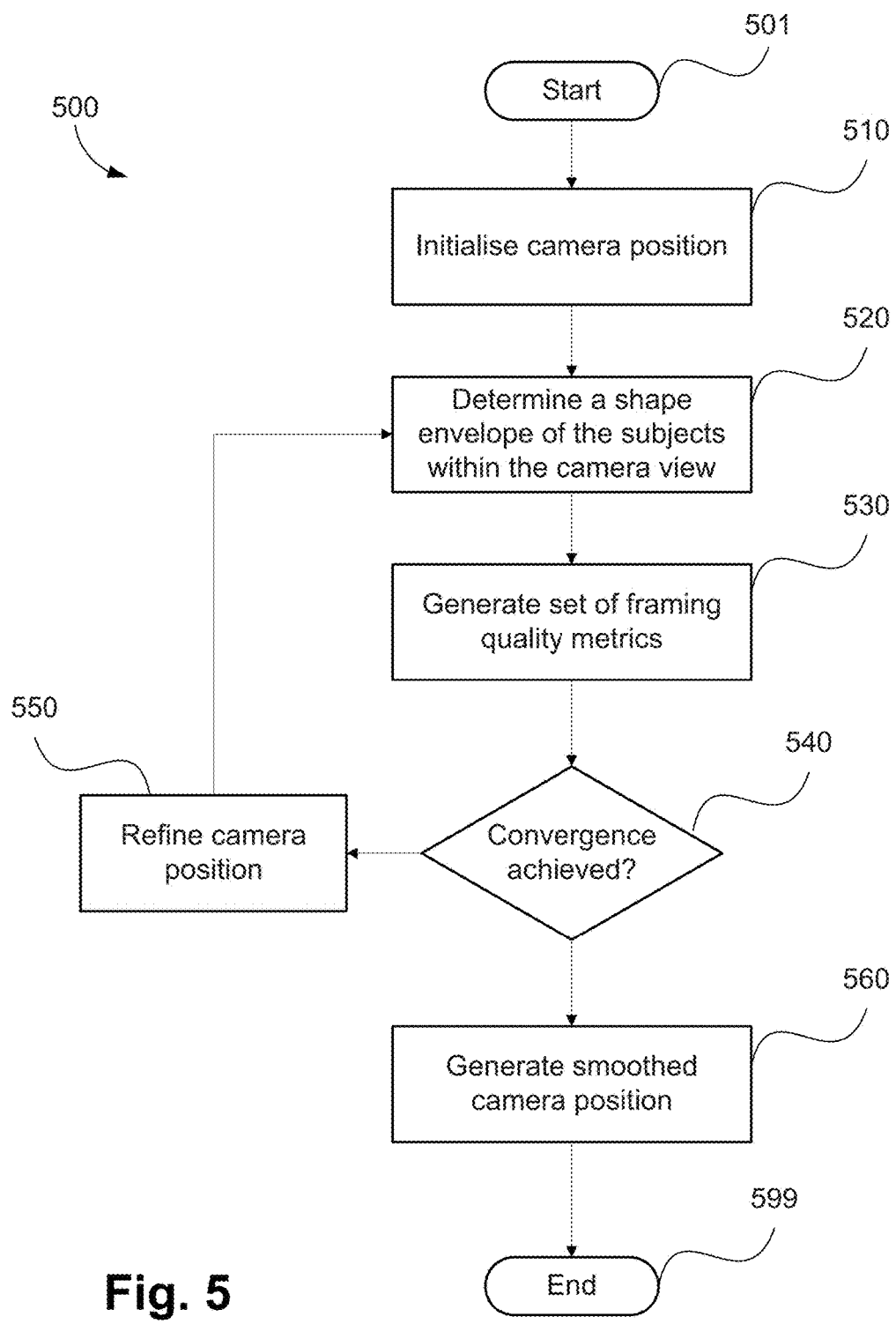
FIG. 5 is a schematic flow diagram showing a method of generating camera coordinates.

Methods described herein may be implemented using the computer system 800 wherein the processes of FIGS. 3 to 5 to be described, may be implemented as one or more software application programs 833 executable within the computer system 800. In particular, the steps of the described methods are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 833 is typically stored in the HDD 810 or the memory 806. The software is loaded into the computer system 800 from the computer readable medium, and then executed by the computer system 800. Thus, for example, the software 833 may be stored on an optically readable disk storage medium (e.g., CD-ROM) 825 that is read by the optical disk drive 812. A computer readable medium having such software or computer program recorded on the computer readable medium is a computer program product. The use of the computer program product in the computer system 800 preferably effects an advantageous apparatus for implementing the described methods.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically includes a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 805 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed arrangements use input variables 854, which are stored in the memory 834 in corresponding memory locations 855, 856, 857. The disclosed arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 3 to 5 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The described methods may alternatively be implemented in dedicated hardware such as one or more integrated circuits performing the functions or sub functions of the described arrangements. For example, the described methods may be implemented using dedicated hardware forming a video processing unit. Such dedicated hardware may include graphic processors, digital signal processors, or one or more microprocessors and associated memories.

The extreme flexibility afforded by the arrangement of FIG. 1 described above presents a secondary set of problems not previously anticipated in sports coverage. For example, the virtual camera used to capture images of the action in the arrangement of FIG. 1 is not constrained to a physical location and is free to change its position and zoom. As such, identifying a "best" location for the camera to capture images of the action on the playing field becomes an unsolved problem. Whereas in conventional sports coverage, a physically restrained camera (e.g., camera 120A) that afforded a best available view of the action needed to be selected, the arrangement of FIG. 1 has the capability to place a virtual camera at a best location, by determining that best location.

Figure 2:
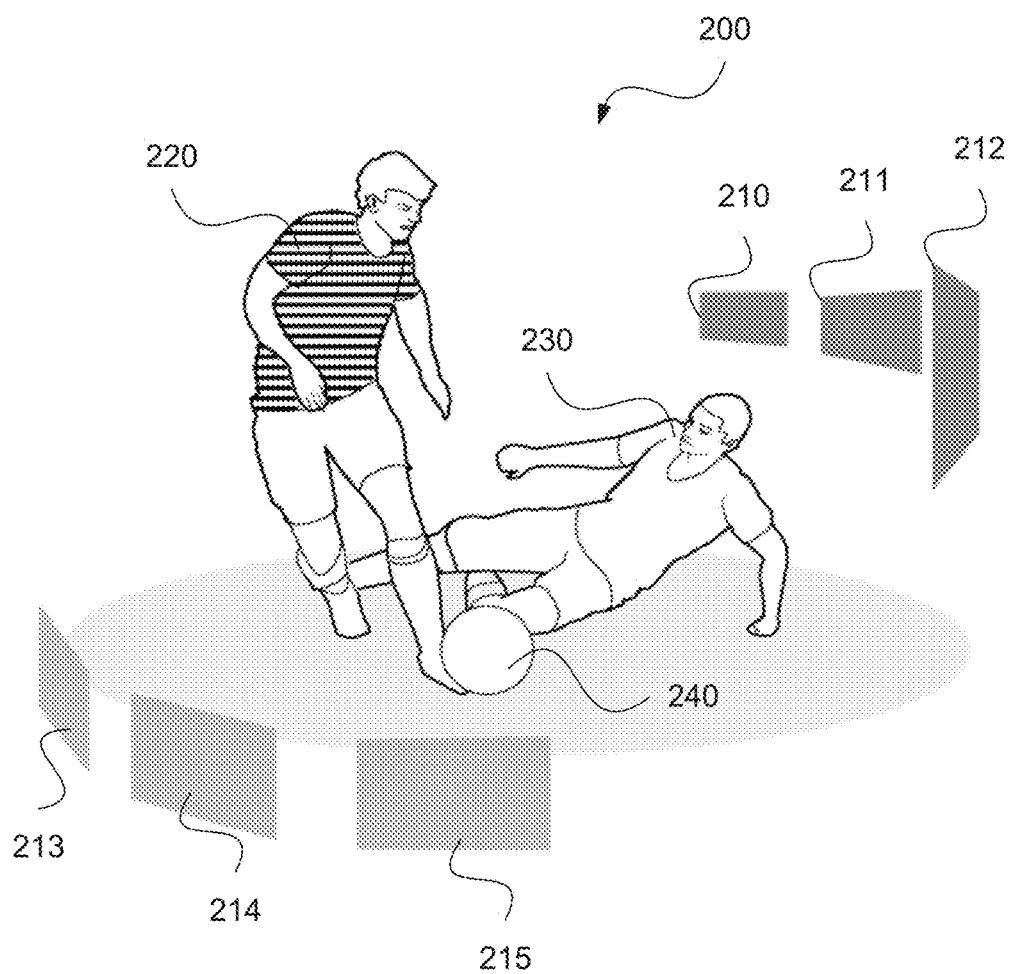
FIG. 2 shows an example captured frame of a sporting event.

As an example, FIG. 2 shows a frame 200 captured of a soccer (football) match. The action shown in the frame 200 is between a player from a first team 220 who is in possession of a ball 240 and a player from an opposing team 230 attempting a tackle. The processing unit 805 may be configured to allow the action shown in the frame 200 to be captured from a large number of potential points of view, such as viewpoints 210, 211, 212, 213, 214 and -215.

There are many factors that influence the location of a camera, including the application of captured images. For example, computational systems may be used in surveillance. In the surveillance context, an objective of such a computational system may be to position a camera to obtain high quality face shots of people in a scene. However sports coverage is not as purely functional as surveillance. For this reason, simplistic approaches to camera positioning, such as simple player or ball tracking, fail to generate compelling content. It is important for sports coverage to be exciting to a viewer and this requires certain compositional methods to be employed.

A method 300 of determining a position of a virtual camera will be described in detail below with reference to FIG. 3. The method 300 may be used for configuring the virtual camera. Parameters of the virtual camera which may be modified to configure the virtual camera may include position, angle, focal distance, orientation of the virtual camera and zoom level associated with the virtual camera.

A typical use for the method 300 is in the generation of video coverage of sports events such as football. However, the method 300 may be applied in many cases where a point of view of the virtual camera ("camera viewpoint") can be algorithmically controlled, including in real-time, to capture well composed video coverage of events involving moving and interacting subjects.

The method 300 may be implemented using the arrangement of FIG. 1. The method 300 may be implemented as one or more software code modules of the software application program 133 resident in the hard disk drive 110 and being controlled in its execution by the processor 105.

The method 300 will be described by way of example with reference to the arena 110 of FIG. 1 and the example frame 200 of FIG. 2. The method 300 begins at identifying step 310, where a region of interest within a scene representing current play is determined under execution of the processor 805. The region of interest is defined by the locations of the ball 240, the nearest players 220 and 230 within the scene and by a projected interaction point. The locations of the players 220 and 230 may be determined, for example, by detecting a first object representing the player 220 and a second object representing the player 230 in the scene, where each object has at least one motion attribute including, for example, velocity and trajectory as described below. The ball 240 may be similarly represented by a third object. The projected interaction point may be determined based on motion attributes of objects including the velocities and trajectories of the players 220 and 230 and the ball 240 in a top view of an orthographic projection of the arena.

Then at determining step 320, the group velocity as well as the locations of the subjects and the anticipated interaction points are used to determine a coarse range of preferable positions for the virtual camera. Each position for the virtual camera corresponds to a configured point of view of the virtual camera. In addition to x, y, z positioning data, the position of the virtual camera may also define a direction that the virtual camera is facing, e.g. using angles $\theta$ and $\phi$. A process may be used at step 320 to determine a virtual camera position for which group velocity (i.e., the average velocity of the subjects including the ball 240, and the players 220 and 230) is directed both towards the virtual camera and across the field of view of the virtual camera from left to right or right to left. Additional knowledge of the direction of play may also be used at step 320 so that the virtual camera is positioned to retain the overall sense of direction of play. A method 400 of determining a coarse camera position, as executed at step 320, will be described in detail below with reference to FIG. 4.

After determining the coarse range of virtual camera positions at step 320, an actual position for the virtual camera is determined at determining step 330 based on compositional framing methods. In particular, the shape and size of the area occupied by the subjects (e.g., ball 240, player 220 and player 230) within a synthesised frame is analysed in combination with the position of the anticipated interaction point. As described below, the subjects and the anticipated interaction point may be used for determining a shape envelope. The shape envelope includes the area occupied by the subjects (e.g., an area corresponding to an object representing the ball 240, another object representing the player 220 and another object representing the player 230).

Fine positioning of the virtual camera simultaneously minimises the separation of the players 220 and 230 while also minimising their overlap, ensuring acceptable filling of the frame 200 while leaving room for action to play out in subsequent frames and respecting any conventions with respect to the direction of play. The determination of the camera position as at step 320 is performed regularly on captured frames to ensure a good framing is continuously achieved. The zoom level used at step 330 should be proportional to the distance between the players 220 and 230 and the future point of interaction up to a predetermined limit. The predetermined limit is configured to ensure that a certain level of detail of the subjects (e.g., the players 220, 230 and the ball 240) is retained. Where the limit is reached, a motion plan that provides a smooth path (i.e., a smooth transition) for the virtual camera is determined, tracking along the same direction as the determined group velocity to the point where the projected future point of interaction is approximately central in the field of view.

As the projected point of future interaction is recalculated and may vary from frame to frame, the position of the virtual camera and trajectory are continuously recalculated. To ensure any motion of the virtual camera is also of broadcast quality, the updated virtual camera position determined at step 330 is subject to processing at smoothing step 340. At step 330, the rate of change of the virtual camera position (relative to the content) that is sent to the processor 205 for use in frame rendering is smoothed (stabilised) and limited.

The method 300 uses group velocity, projected interaction point and projected action shape onto the image plane to determine the virtual camera point of view (or viewpoint). Several other aspects including the integration of zoom limits and the calculation of a motion path to address instances where the distance between the players (e.g., 220 and 230) and the future interaction point is large will be described below. Also described below, steps may be performed for dealing with additional players that may enter the field of view of the virtual camera in a way that interferes with or significantly reduces the quality of the computational frame rendering process.

Each of the steps of the method 300 of FIG. 3 will now be described in detail. At step 310, a group of subjects that are to be composed into a field of view of the virtual camera is identified. The subject selection will be described by way of example with reference to FIGS. 1 and 2. A map view of the game play which comprises a 2D orthographic top view of the arena 110 such that there is symbolic representation of the ball 240 and players—(e.g. 220 and 230) is generated at step 310. The map view need not be an image but contains sufficient information that the map view could be rendered as an image having iconographic representations of the players 220, 230 and ball 240. Specifically, the map view of the arena 110 contains information about the size and shape of the arena 110, and the positions of all of the players (220, 230), referee 195 and the ball 240. The map view is updated continuously at video frame rates and is an input to the steps performed by the method 300. The map view itself can be constructed and maintained using a number of different technologies. In one arrangement, radio tracking and arena specifications are combined to construct a model of the playing arena 110 from a projective top view perspective. Video data may also be used for map construction, especially where a camera is placed directly above the playing field. The use of radio tracking has the advantage however of reducing player identification and tracking ambiguities when compared to video analysis alone.

An action region corresponding to the region of interest and containing a group of subjects is identified at step 310. Any number of action regions may be identified and processed simultaneously however there are many practical reasons to limit the number. Firstly, generation of synthetic viewpoint video data is demanding on both data and computational resources. Secondly, the processed images may ultimately be used to generate a single video stream which is the broadcast video stream for the event. As the single video stream may be directed by one or more human operators, a small number of high quality inputs is preferable to a large number of assets of highly varied quality. In some cases the broadcast video may be produced according to a fully automated method which has more detailed knowledge of the game structure and schedule and types of game events. In both cases, the described arrangements may be used to provide the shot level input to a final production process.

An action region corresponding to the region of interest within the playing arena 110 may be identified at step 310 based on the location of the ball 240. Ball location may be determined by the use of a wireless tracking device contained within the ball 240. Such tracking devices are available commercially and may operate in combination with GPS based tracking devices worn by the players (e.g., 220 and 230). Such a tracking device arrangement has several advantages. Firstly, the tracking device configured in the ball 240 can be made extremely light so that the tracking device does not interfere with the natural balance and flight properties of the ball 240. Secondly, the tracking device within the ball 240 explicitly identifies a group of players that are proximal to the ball 240 thus aiding in the identification of a subject set (e.g., the players 220, 230). Other methods may also be used for to identify an action region within the playing arena 110 at step 310. For example, player and ball recognition, segmentation and tracking based on video images only may be used at step 310. If performed on video images with a sufficiently high and wide view of play, a search radius around the ball 240 may be used to identify players of immediate interest. The radius of the search region around the ball 240 may be determined at the minimum radius that captures the requisite players. Specifically, the radius may be determined to include at least one player from each of at least two opposing teams.

Position data for players may be retained in a circular history buffer configured within the memory 806 and is available for use in play analysis. The retention of player and ball position data relative to the playing field allows for player tracking which in turn allows per-player trajectory and velocity calculations to be readily performed. The retained player and ball position data may be used to determine relative temporal motion of the virtual camera.

The temporal motion may be used to track each object representing a subject (e.g., player, ball) along a trajectory.

Having identified an area of action corresponding to the region of interest as at step 310 described above, the method 300 proceeds to determine a coarse range of potential camera positions at determining step 320. At step 320, the group velocity as well as the locations of the subjects and the anticipated interaction points are used to determine a coarse range of preferable camera positions. Camera positions are determined at step 320 such that the group velocity (i.e., the average velocity of the subjects) is directed both towards the camera 120A and across the field of view of the camera 120A from left to right or right to left. A method 400 of determining a coarse camera position, as executed at step 320, will now be described with reference to FIG. 4.

The method 400 may be implemented using the arrangement of FIG. 1. The method 400 may be implemented as one or more software code modules of the software application program 333 resident in the hard disk drive 310 and being controlled in its execution by the processor 305.

Again, the method 400 will be described by way of example with reference to the arena 110 of FIG. 1 and the example frame 200 of FIG. 2.

The method 400 determines velocities, comprising the two-dimensional (2D) speed and direction within the map view, of the subject group including the players 220 and 230 and the ball 240. Velocities are determined from a smooth motion path for the subject players for a preceding time window.

The method 400 begins at identifying step 410, where the location velocity of the ball 240 is first determined, under execution of the processor 805. The location velocity of the ball 240 is used at identifying step 420 to identify the subject group of players. The subject group of players is defined as the smallest group containing at least one player (e.g., player 220 and 230) from each of the opposing teams who are projected to reach the ball 240 first out of all available players. Other methods may be used to determine the subject group including a simple radius about the ball 240. However, the subject group most likely to achieve interaction with the ball 240 is advantageous for compositional purposes as it allows more long term virtual camera positions to be established that can capture interactions within the game with visual continuity. Likelihood of interaction with the ball 240 is determined based on the combination of player velocities and the ball velocity. Note that the height of the ball 240 above the ground is available when a radio locating device is used and the height of the ball 240 above the ground may also be used to determine the players most likely to be involved in a near future interaction with the ball 240.

Having established the subject group, processing now turns to determining the virtual camera position at determining step 430. At step 430, a group velocity is determined under execution of the processor 805. The group velocity (speed plus direction) is the mean velocity of the combined subject group including the ball 240.

Then at determining step 440, the point of most likely interaction in the scene is determined under execution of the processor 805. The point of interaction determined at step 440 is defined as the first point at which the player(s) 220/230 and ball 240 are projected to converge. Note that the ball 240 needs to be within a certain height range for convergence to be achieved. The point of interaction may be determined based on the trajectories (direction of the velocity vectors) of the objects representing the players and ball within the scene. The trajectories of each of the objects may be used to determine a combined trajectory for the objects for use in determining the interaction point of the objects.

In one implementation, the group velocity determined at steps 430 and the point of interaction determined at step 440 is a by-product of the subject set determinations performed at step 420.

Having established the key compositional points, a coarse virtual camera position determination is then performed at determining step 450. In one arrangement, step 450 is implemented in two passes. In the first pass, a preferred region is determined under execution of the processor 805. The preferred region is determined such that a camera placed anywhere within the preferred region, can be oriented such that all of the subject players (e.g., 220 and 230) lie within the field of view of the camera 240 and at least one of the ball 240 and the point of future interaction has a predetermined spatial relation. In the described arrangement, the preferred region is determined such that the position of the ball 240 or point of future interaction falls between the subject players and the camera. Further details are described later with reference to FIG. 6.

A coarse camera position within the preferred region is then determined in one of two ways. If no previous frames have been calculated for the virtual camera, the position for the virtual camera is selected to be in the centre of the preferred region. If a previous frame has been calculated for the virtual camera, then the point in the preferred region closest to the position of the virtual camera during the previous frame is used. The determined coarse camera position may be stored in the memory 806, under execution of the processor 805. Having determined the initial coarse virtual camera position, the method 400 concludes.

Referring back to the method 300 of FIG. 3, the coarse virtual camera position, determined at step 320 according to the method 400 of FIG. 4 and outlined above, is subsequently refined at refining step 330 to produce an improved virtual camera position for the frame. The refinement is performed at step 330 using a minimisation process which will now be described in detail with reference to FIG. 5.

The method 500 may be implemented using the arrangement of FIG. 1. The method 500 may be implemented as one or more software code modules of the software application program 333 resident in the hard disk drive 310 and being controlled in its execution by the processor 305.

Again, the method 500 will be described by way of example with reference to the arena 110 of FIG. 1 and the example frame 200 of FIG. 2.

The method 500 begins at initialising step 510, where the virtual camera position determined in accordance with the method 400 is accessed, for example, from the memory 806. The virtual camera position determined in accordance with the method 400 is used at step 510 to initialise a processing structure used during minimisation processing. The minimisation processing used at step 510 seeks to maximise the area of the rendered frame that contains close but minimally overlapping subject players (e.g., players 220, 230). The subject players should appear close together in the composed frame to make it easy for the viewer to take in the details of the composed frame (e.g. 200) without the viewer having to scan their gaze widely across the frame. The gaze of the viewer is preferably led by the virtual camera framing over the broader action sequence, from one side of the field of view, towards the centre of the frame, reaching the centre of the frame at the same time as the play reaches the projected point of future interaction. The composition method used at step 510 is described in more detail below with reference to FIG. 7.

The quality of the framing from a compositional perspective (also referred to herein as the framing quality) is expressed in the form of a cost function which is a weighted sum of terms, each term providing a numeric score relating to a particular aspect of the framing quality. In this way it is possible to generate a refined virtual camera position that takes into account a number of attributes of framing quality, each attribute being determined using independent methods as outlined below. This is achieved by the loop comprising steps 520, 530, 540 and 550.

At determining step 520, a low detail rendering of the overall subject locations within the field of view of a specified virtual camera position is generated under execution of the processor 805.

The low detail rendering lacks spatial resolution and tonal accuracy when compared to a final rendered frame but contains sufficient detail that analysis of the framing quality can be performed. In particular, the relative position and size of the subject players, ball and point of interaction within the frame can be recovered. A coarse map of size and relative position of relevant subjects and future events is referred to as a shape envelope or framing envelope and is used in subsequent processing to determine framing quality.

For the purposes of this disclosure, the relevant subjects are the subject players and the ball, and the future event is the determined interaction point. The future event is associated with a relative position and a size of an area of future interaction in the coarse map, i.e. the shape envelope comprises the subject players and the ball and the area of future interaction, each associated with a relative position and a size. The area of future interaction is an area comprising the subject players at the point of interaction. The area of future interaction can be expanded to include a further subject player if the further subject player is heading towards the point of interaction as detected by process 400. The area of future interaction is expanded sufficiently to include the further subject player at the point of interaction. As such, the shape envelope changes dynamically depending of the subject players located about the point of interaction or heading towards the point of interaction as determined from the map view of the play in process 400.

Further details on the use of the shape envelope to calculate aspects of framing quality are discussed later with reference to FIG. 6. The determined virtual camera position defines relative positions, within the shape envelope, of the subject player, ball and the interaction point determined at step 440 in the field of view of the virtual camera. The shape envelope is generated from the determined low detail rendering. The metrics are combined at step 530 to create an overall score. The determined score may be stored in the memory 806, under execution of the processor 805.

At comparing step 540, the score determined at step 530 is compared to previously determined scores, under execution of the processor 805, to determine if the algorithm has converged on a preferred virtual camera position. If it is determined at step 540 that convergence has been achieved, then the coarse virtual camera position, determined at step 320, is passed on to modifying step 560. At modifying step 560, the coarse virtual camera position is modified in light of previous virtual camera positions to generate a smoothed virtual camera position ensuring that the overall path of the virtual camera from frame to frame is a smooth one. The previous virtual camera positions represent the temporal camera motion associated with the virtual camera. However, if it is determined at step 540 that convergence has not yet been achieved, then the virtual camera position is modified 550 and the method 500 returns to step 520 where the rough rendering of the frame from the new virtual camera position is determined. Many optimisation techniques define methods for refining input variables based on changes in the quality metric resulting from changes in the control variables. In the arrangement of FIG. 5, an iterative optimisation based on Newton's method is used in the method 500. However, various other methods including linear programming, dynamic programming or gradient descent methods may equally be applied.

Mathematically, the steps 520, 530, 540 and 550 solve Equation (1), as follows:

$$\arg\max_{x,y,z,\theta,\phi\in\Omega} \text{quality}(\text{frame}(x, y, z, \theta, \phi)) \quad (1)$$

where x, y and z are the coordinates of the virtual camera defining the position of the virtual camera in the space of the arena 110, θ and φ define the direction the camera is facing and Ω is the region identified at step 445 of the method 400. This arrangement assumes the camera is always oriented horizontally and hence there is no additional "roll" angle required in the optimisation calculation. Values for x, y, z, θ and φ that maximise a quality function within the constraint that x, y, z, θ and φ are in the region Ω, are determined in accordance with Equation (1) As described above, the values for x, y, z, θ and φ are used as the input to a smoothing step at 560 that generates the final camera point of view to be used for generating the frame.

Efficient determination of the fine positioning of the virtual camera is dependent on the described arrangements being able to quickly render the locations of the main scene elements, such as the subject players 220, 230 and the ball 240, into a frame (e.g., 200) representing the point of view (or viewpoint) of the virtual camera. The determination of the fine positioning of the virtual camera is captured by the function frame(x, y, z, θ, φ) in Equation (1) above. The rendering does not require full image detail but should generate at least a binary shape envelope indicating the locations and coarse shapes of subjects (e.g., 220, 230) within the scene. In one arrangement, a label image of an appropriate bit depth may be used. The shape envelope may be generated at step 520 and used in subsequent steps to determine the quality of the framing, in accordance with the quality(f) part of Equation (1) above.

In one arrangement, several methods may be balanced to distribute the subjects within the frame 200. A first method may relate to the subject player area, where the first method determines that the subjects are close but have minimal occlusion. Quality may be determined as the length of the largest contiguous horizontal span containing subject players. A second method relates to the projection of the area of future interaction and the ball 240. For the second method, quality is increased in proportion to the proportion of the total horizontal span of the areas of the shape envelope that are included in the field of view of the virtual camera associated with a current virtual camera position. The concept of horizontal span and a method for its calculation are described later with reference to FIG. 6. Note that the size of the subject players is already constrained to be within an acceptable range as the result of range selection in the method 400. However, an additional method may be added to determine a quality measure that peaks when the subject players fit within pre-defined vertical bounds. Although linear relationships between measured properties of the projections of the subject areas onto the synthesised video frame are described above, other relationships may be used. For example, a non-linearity may be applied to the otherwise linear measure to allow a peak in quality to be created about a pre-defined preferred value. Such a non-linearity may be determined through experimentation and hand coding or may be learned using a leaning algorithm based on a suitable number of training examples. Indeed, in an alternative arrangement, the entire framing quality metric may be determined using a machine learning technique given a suitable data reduction step operating on the coarsely rendered frame to extract feature values in combination with sufficient and suitable training examples.

Finally, the arrangements described above are flexible enough that the virtual camera position refinement may take into account the likely render quality of the final frame. For example, rather than defining the described methods in terms of compositional objectives, render quality may relate to technical aspects of frame synthesis including the availability of suitable dense pixel data for use in frame synthesis, the presence of occlusions, the width of the largest area that requires in-painting or interpolation, the confidence of the 3D modelling or any other aspect that will influence the ability of the image based rendering process to generate realistic data.

The methods 400 and 500 will now be described in further detail with reference to FIGS. 6, 7A and 7B which provide concrete examples of the operation of the methods in the arrangement.

Figure 6:
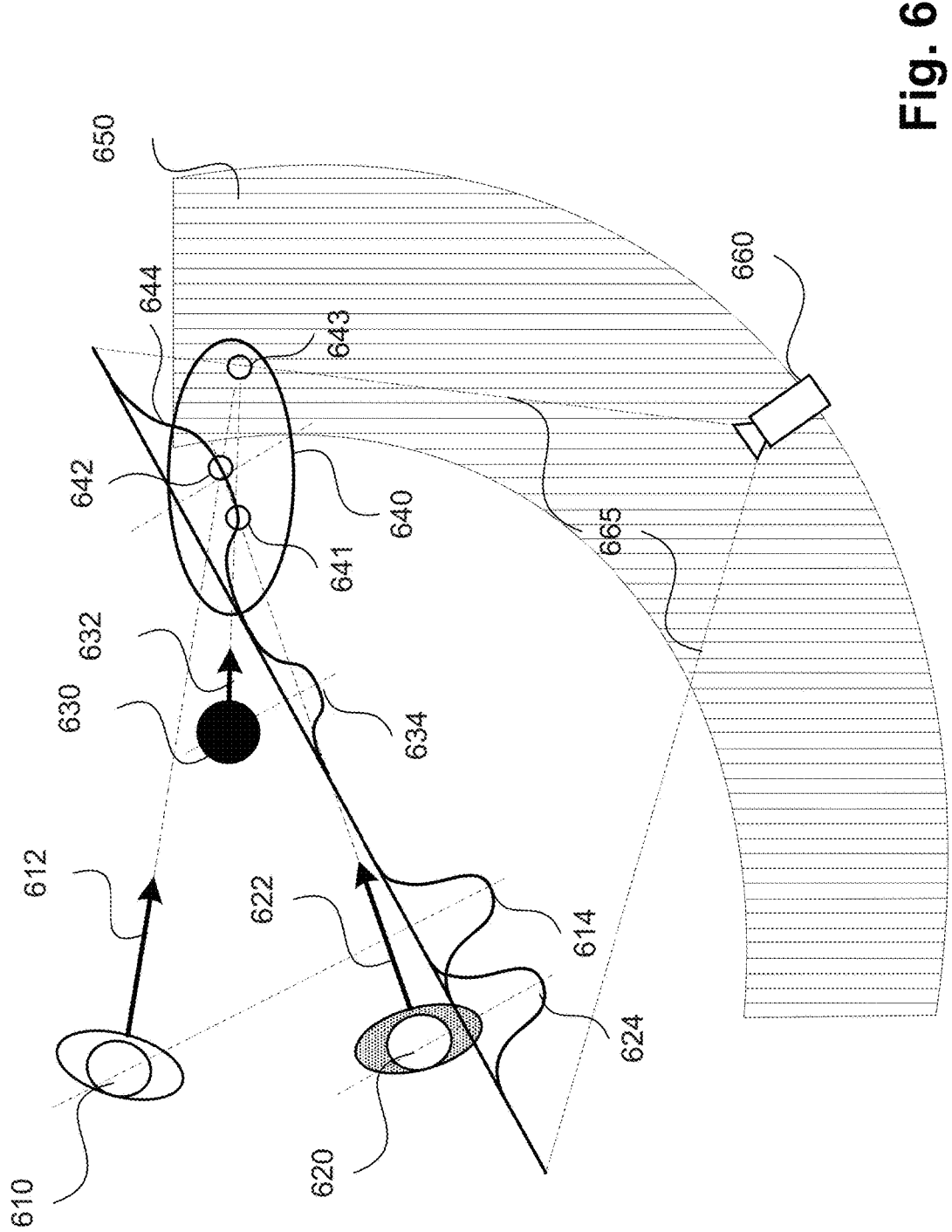
FIG. 6 is a top view of two opposing players, travelling with velocities depicted in FIG. 6.

FIG. 6 is a top view showing a coarse representation 610, 620 of the two opposing players such as 220 and 230 of FIG. 2, travelling with velocities depicted by 612 and 622 respectively. Because of their proximity to the ball 240, represented by the coarse representation 630, the player representations 610 and 620 form the subject group of an action area as would be identified by step 310 of the method 300 and the expanded subprocess 400. The ball 240 has velocity depicted by 632. Projecting the velocities forward produces a set of intersection points 641, 642 and 643. By taking a centroid of the points 641, 642 and 643 an elliptical area 640, with radius proportional to the variance in the position of the centre points in different directions, can be defined. The area 640 is the area of most likely future interaction that is identified in step 440 of method 400. At step 445, a region 650 from which a virtual camera 660 would be able to capture both the subjects within its field of view 665 is then determined. The method employed in this step seeks a position for the virtual camera for which group velocity (i.e., the average velocity of the subjects) is directed both towards the virtual camera and across the field of view of the virtual camera from left to right or right to left. Additionally, the area 650 is constrained to only include points of view from which all of the subjects are visible and are within a predefined distance range of the virtual camera so as to maintain a minimum subject size within the field of view. In the example of FIG. 6, the region 650 is determined as the region between two circular arc segments at radii corresponding to the minimum and maximum subject distance methods and centred about the mean position of the subject players 220, 230 and the ball 240. Other formulations are possible for this step and may be selected based on the state of play, position of the field etc. For example, circular arc segments defining the region 650 may be replaced with elliptical segments for which the long axis of the ellipse is aligned with the direction of play (as determined by the group velocity), giving more scope for the virtual camera to be placed anywhere along the line of play between the subject players 610, 620 and the point of future interaction

640. The centre selection may also take into account the position of the future interaction area 640.

In one arrangement, the future interaction area may be included in the determination of the region 650 in a first pass and then excluded if the requisite distance range to the subject players 610, 620, cannot be attained. This occurs, for example, when the subject players and the future interaction area are sufficiently distant from each other.

In order to determine the horizontal extent of the subject areas for the purpose of framing quality evaluation, the described methods, which are performed at step 530 process 500 perform dimensionality reduction by projecting down the columns of the shape envelope determined at step 520 and smoothing the resulting signal. This creates a signal having a smooth bump corresponding to each of the subjects. The signal is also exemplified in FIG. 6 where bump 624 corresponding to the accumulated row data corresponding to the subject player 620. Similarly, bump 614 corresponds to the subject player 610; bump 634 corresponds to the ball 630; and 644 corresponds to the subject players 610 and 620 at the expected future area of interaction. As mentioned above, the extent of the area 644 changes dynamically depending of the subject players, detected from the map view of the play in process 400, at about the point of interaction or heading towards the point of interaction.

For the purpose of quality evaluation, the signals can be generated independently and combined arbitrarily. For example, the horizontal span corresponding to the subject players can be obtained by adding the signals corresponding to each player, thus creating a signal comprising 624 and 614, and applying a threshold then measuring the largest contiguous non-zero segment. This produces a measure proportional to the distance in the signal from the leading edge of 624 through to the trailing edge of 614. Similar methods can be used when assessing the degree of presence of the ball and interaction area.

Framing quality is further detailed with reference to the example of FIG. 7. FIG. 7A shows a first framing of a scene for the example of FIG. 6 containing the two opposing players 220 and 230, represented as 711 and 713 respectively and corresponding to 620 and 610 respectively of FIG. 6, approaching the ball 240 represented as 712, corresponding to 630 of FIG. 6. For a virtual camera 720 positioned as shown in FIG. 7A, the images of the players project onto the image plane represented by 721 to create the shape envelope 730. In the shape envelope 730 of FIG. 7A, player 220 appears at 731 and player 230 appears at 733 which are spatially close but not overlapping within the frame 730. The ball 240 appears at 732 and thus the overall motion of the action is from left to right. FIG. 7A represents a desirable framing of the action.

Figure 7A:
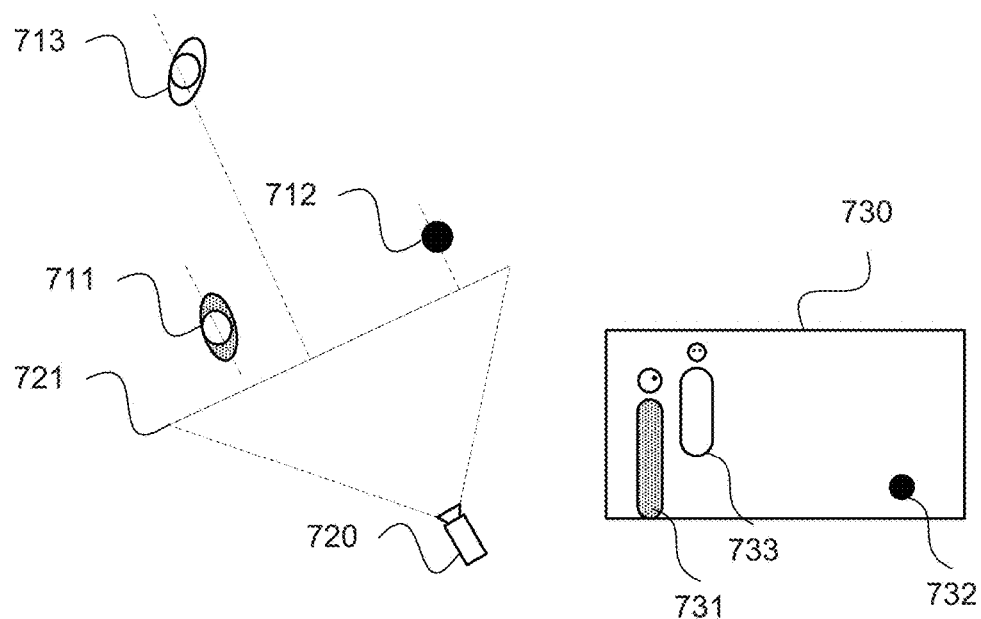
FIG. 7A shows a first framing of a scene containing two opposing players who are approaching a ball.
Figure 7B:
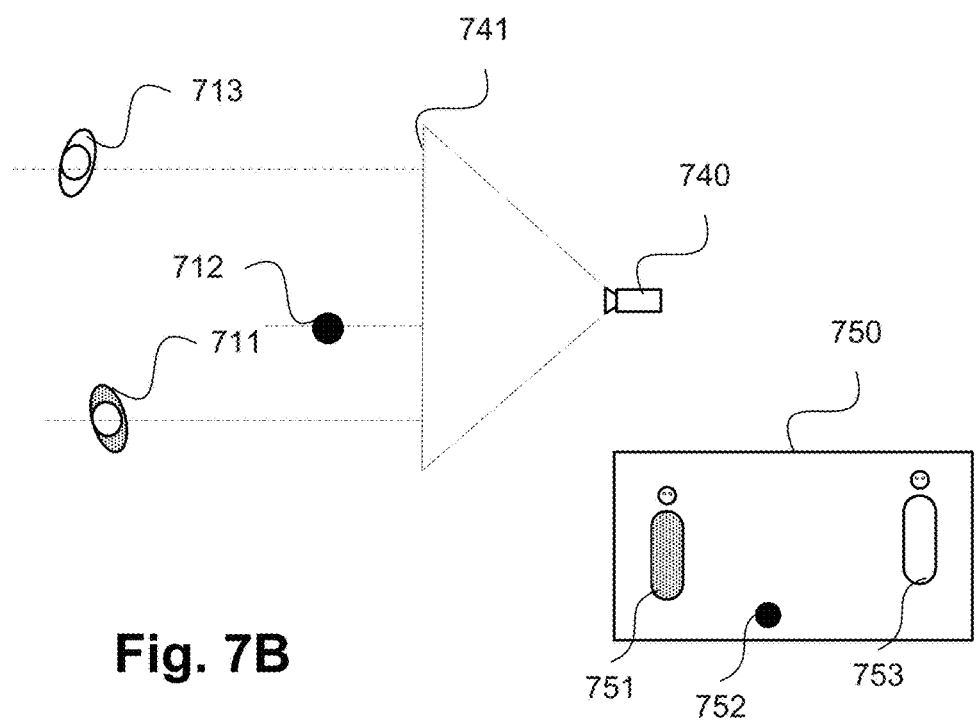
FIG. 7B shows a second framing of a scene containing two opposing players who are approaching a ball.

By contrast, FIG. 7B demonstrates an equally valid but less desirable framing of the same action shown in FIG. 7A. In the example of FIG. 7B, a virtual camera 740 is placed as shown in FIG. 7B so that the ball 240, represented by 712 is between the players 220 and 230 represented by 711 and 713 respectively and the virtual camera 740. In this framing, the action is directed towards the virtual camera 740. The players project onto the image plane represented by 741 such that player 220 appears at 751, player 230 appears at 753 and the ball 240 appears at 752 to form the shape envelope 750. In the composition shown in FIG. 7B, the players 220 and 230 appear at opposite sides of the frame 750 requiring the viewers gaze to flip continuously from left to right in order to follow the flow of the action. FIG. 7B represents a poor framing of the action that would achieve a low framing quality score than the framing of FIG. 7A.

The methods described above and implemented using the described arrangements achieve framing of the action having the compositional characteristics exhibited by the shape envelope 730 of FIG. 7A. Specifically, the flow of action is across the frame and the key subjects appear close together in the frame so that the degree of visual scanning required of the viewer is reduced.

The arrangements described herein have direct application to the generation of broadcast quality video coverage of sporting events as described. However, the described arrangements have broader application to any event for which computational video coverage is possible due to the described arrangements being performed in a convex space that can be surrounded by synchronised cameras. In each case, different heuristics may be required to determine the areas of interest and assess the quality of the composed frame. However, the broad general concept of grouping subjects and ensuring an orderly motion of action across the field of view of the synthesised camera position remain.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A control apparatus configured to control a virtual camera defining an imaging range of a virtual viewpoint image, the apparatus comprising:
   one or more hardware processors; and
   a memory which stores instructions executable by the one or more hardware processors to cause the control apparatus to perform at least:
   determining, based on a result of detection of position and motion of at least one object in a scene a position of a specific event expected to occur after a point of time of the detection, wherein the specific event is related to the at least one object;
   controlling at least one of position and orientation of the virtual camera according to the determined position before occurrence of the specific event such that the detected position of the at least one object and the determined position of the specific event are included in a field of view of the virtual camera.

2. The apparatus according to claim 1, wherein an interaction point is determined as the position of the specific event based on motion of a first object and a second object in the scene.

3. The apparatus according to claim 2, wherein a shape envelope to be captured by the virtual camera is determined based on size and shape of an area occupied by the first and second objects.

4. The apparatus according to claim 2, wherein the virtual camera at a controlled viewpoint captures, in a field of view, the first object and the second object at the determined interaction point.

5. The apparatus according to claim 2, wherein a point of view of the virtual camera is determined based on a distance between the determined interaction point and at least one of the first object and the second object.

6. The apparatus according to claim 1, wherein a controlled point of view of the virtual camera is determined based on a combination of motion attributes of a first object and a second object in the scenes.

7. The apparatus according to claim 3, wherein a controlled point of view of the virtual camera is determined based on the shape envelope and a combined motion attribute.

8. The apparatus according to claim 1, wherein a controlled point of view of the virtual camera is determined based on a previously determined point of view of the virtual camera.

9. The apparatus according to claim 3, wherein a transition to a controlled point of view of the virtual camera from a previously determined point of view of the virtual camera is determined based on at least one of the shape envelope and a combined motion attribute.

10. The apparatus according to claim 1, wherein the virtual camera is controlled based on occlusions.

11. The apparatus according to claim 1, wherein the virtual camera is controlled based on a width of a largest area that requires in-painting.

12. The apparatus according to claim 1, wherein temporal motion of the virtual camera is determined to track objects along a combined trajectory of a first object and a second object in the scene.

13. The apparatus according to claim 1, wherein the instructions further cause the apparatus to modify at least one of position and orientation of the virtual camera.

14. The apparatus according to claim 1, wherein the instructions further cause the apparatus to determine a region from which the virtual camera is able to capture objects within a field of view of the virtual camera.

15. The apparatus according to claim 14, wherein the region is defined by two circular arc segments.

16. The apparatus according to claim 14, wherein the region is defined by elliptical segments.

17. A computer-implemented method for controlling a virtual camera defining an imaging range of a virtual viewpoint image, said method comprising:
  determining, based on a result of detection of position and motion of at least one object in a scene, a position of a specific event expected to occur after a point of time of the detection, wherein the specific event is related to the at least one object; and
  controlling at least one of position and orientation of the virtual camera according to the determined position before occurrence of the specific event such that the detected position of the at least one object and the determined position of the specific event are included in a field of view of the virtual camera.

18. A system for controlling a virtual camera defining an imaging range of a virtual viewpoint image, said system comprising:
  a memory for storing data and a computer program;
  one or more processors coupled to the memory for executing the computer program, the computer program comprising instructions for:
    determining, based on a result of detection of position and motion of at least one object in a scene, a position of a specific event expected to occur after a point of time of the detection, wherein the specific event is related to the at least one object; and
    controlling at least one of position and orientation of the virtual camera according to the determined position before occurrence of the specific event such that the detected position of the at least one object and the determined position of the specific event are included in a field of view of the virtual camera.

19. A non-transitory computer readable medium having a program stored on the medium for controlling a virtual camera defining an imaging range of a virtual viewpoint image, said program comprising:
  code for determining, based on a result of detection of position and motion of at least one object in a scene, a position of a specific event expected to occur after a point of time of the detection, wherein the specific event is related to the at least one object; and
  code for controlling at least one of position and orientation of the virtual camera according to the determined position before occurrence of the specific event such that the detected position of the at least one object and the determined position of the specific event are included in a field of view of the virtual camera.

20. A computer-implemented method according to claim 17 further comprising:
  detecting a first object and second object in the scene, each said object having a position and at least one motion attribute; and
  determining an interaction point in the scene based on the positions and the motion attributes of the first and second objects;
  wherein the virtual camera is controlled based on a position of the first object and the second object at the determined interaction point relative to a controlled point of view of the virtual camera.

* * * * *